US008073444B2

(12) United States Patent
Riley

(10) Patent No.: US 8,073,444 B2
(45) Date of Patent: Dec. 6, 2011

(54) DISTRIBUTED POLICY SERVICES FOR MOBILE AND NOMADIC NETWORKING

(75) Inventor: Yusun Kim Riley, Marlborough, MA (US)

(73) Assignee: Camiant, Inc., Marlborough, MA (US)

( * ) Notice: Subject to any disclaimer, the term of this patent is extended or adjusted under 35 U.S.C. 154(b) by 558 days.

(21) Appl. No.: 11/687,193

(22) Filed: Mar. 16, 2007

(65) Prior Publication Data

US 2008/0025261 A1    Jan. 31, 2008

Related U.S. Application Data

(60) Provisional application No. 60/783,232, filed on Mar. 17, 2006, provisional application No. 60/783,230, filed on Mar. 17, 2006.

(51) Int. Cl.
*H04W 4/00* (2009.01)
(52) U.S. Cl. ............. 455/433; 370/338; 455/435.1; 455/432; 455/404.2; 455/456.1
(58) Field of Classification Search .......... 455/435.1, 455/432.1, 404.2, 414.2, 456.1, 450, 433, 455/533; 370/338
See application file for complete search history.

(56) References Cited

U.S. PATENT DOCUMENTS

| 6,324,169 | B1 * | 11/2001 | Roy ........................ 370/260 |
| 6,910,074 | B1 | 6/2005 | Amin et al. |
| 2002/0004394 | A1 * | 1/2002 | Tsai et al. ................ 455/432 |
| 2002/0036983 | A1 * | 3/2002 | Widegren et al. ......... 370/230.1 |
| 2002/0126633 | A1 | 9/2002 | Mizutani et al. |
| 2003/0027572 | A1 * | 2/2003 | Karlsson et al. ............ 455/433 |
| 2004/0205193 | A1 | 10/2004 | Hurtta et al. |
| 2006/0059551 | A1 | 3/2006 | Borella |

OTHER PUBLICATIONS

PCT—International Search Report, mailed Nov. 15, 2007.
Supplementary European Search Report for EP07797174, dated Apr. 7, 2010, 8 pages.
Examiner's Report for Australian Application No. 2007249647 (Feb. 10, 2011).
Communication pursuant to Article 94(3) EPC for European Application No. 07797174.5 (Jan. 20, 2011).
Examiner's Report for Australian Application No. 2007249647 (Nov. 4, 2010).
Communication pursuant to Article 94(3) EPC for European Application No. 07797174.5 (Jul. 16, 2010).
Commonly-assigned, co-pending U.S. Appl. No. 13/194,886 for "Distributed Policy Services for Mobile and Nomadic Networking", (Unpublished, filed Jul. 29, 2011).

* cited by examiner

*Primary Examiner* — Nick Corsaro
*Assistant Examiner* — Quan Hua
(74) *Attorney, Agent, or Firm* — Jenkins, Wilson, Taylor & Hunt, P.A.

(57) ABSTRACT

A method of disseminating topology information related to a subscriber in a system having one or more networks, each network having access devices and policy functions, includes identifying a current location of the subscriber by a serving policy function. The method further includes forwarding information relating to the current location from the serving policy function to an anchor policy function associated with the subscriber. The process of identifying the location of the subscriber and forwarding the information to the anchor policy server is repeated each time the subscriber changes its physical location. The system uses the current location information to route policy information from the anchor policy function to the policy function that is serving the subscriber. The system may use a push model, a pull model, or a combination thereof, to disseminate the topology information.

19 Claims, 9 Drawing Sheets

DISTRIBUTED POLICY SERVICES FOR MOBILE AND NOMADIC NETWORKING

CROSS REFERENCE TO RELATED APPLICATIONS

This application claims benefit of the following Patent Applications: U.S. Provisional Patent Application Ser. No. 60/783,232, filed Mar. 17, 2006. U.S. Provisional Patent Application Ser. No. 60/783,230, filed Mar. 17, 2006.

BACKGROUND OF THE INVENTION

The present invention relates to communication systems and services for distributing digital content, and more particularly, to techniques for properly associating subscribers with appropriate policy servers regardless of the physical location of the subscriber.

FIG. 1 shows a prior art system 10 for delivering digital content to a number of subscribers. An application function 12 (in this example a P-CSCF; proxy call session control function), provides session setup functions to enable subscribers to make VoIP calls, or can also be a server, which serves digital content such as a video stream to one of several subscribers 14. The subscribers may include any of a number of electronic devices such as telephones or personal computers. These electronic devices may be wireless or they may be connected to a local wired network.

During a session, the digital content the application server 12 provides to a subscriber 14 may pass through a number of network components. The content passes through enforcement points(s), but the signaling to request policy is signaled between the policy elements in the diagram—the policy router 16 and the policy server 18 as well as the enforcement point.

The enforcement point 20 is an edge device, such as a cable modem termination system (CMTS), GPRS gateway support node (GGSN), a packet data serving node (PDSN), etc. In general, an enforcement point can be any entity in the network through which packets traverse during the subscriber's session. The enforcement points 20 are not dedicated to any particular application server 12, but instead resources on the enforcement points are allocated to the subscriber's application session by the policy function (e.g., the policy server 18 in this example) in the network.

"Policy function" is used as the generic term for an entity in the network that is performing policy. The primary purpose of the policy function is providing the appropriate Quality of Service for the session, as well as managing any billing and accounting information associated with the session. The policy function is responsible for conveying or "pushing" a policy decision to the enforcement point 20, and making sure the correct set of policies for the subscriber is set. The policy function thus controls the enforcement point 20 via on behalf of the application server 12.

The policy router 16 in the above diagram is a policy function that also can route or forward policy requests to a downstream policy function. In the example of FIG. 1, the application server 12 conveys a policy request to the policy server 20 via the policy router 16.

In general, FIG. 1 shows a service provider policy environment supporting multiple applications, multiple subscribers and multiple subscriber edge devices. The subscriber edge devices 20 function as policy enforcement points for operator policies relating to Quality of Service, Bandwidth Management, and Admission Control.

SUMMARY OF THE INVENTION

The following are some key goals of the policy environment provided by the described embodiments:
 Applications should not require knowledge of the network topology or technology. The policy servers in the network should take care of the topology abstraction so applications can remain topology unaware.
 The policy environment should scale to countrywide deployments.
 The actual network topology should be dynamic. Network subscribers, policy servers, enforcement points, and their interconnections can be added, changed, or deleted. Administrative provisioning may be minimized
 Subscribers should be able to access applications from different networks and different service providers. This type of roaming behavior means the enforcement points associated with the subscriber could change over time. Also, a subscriber could potentially access services and applications from different networks and providers, potentially at the same time.
 Network subscribers should be able to access the network from different subscriber edge devices at different times (i.e., the subscribers are nomadic) or move between one subscriber edge device and another during the same session (i.e., the subscribers are mobile).
 Regardless of where the subscriber is attaching from, the subscriber should be provided with the consistent set of policies. Policy governs the following types of attributes of a subscriber's service:
  the subscribers' entitlements (i.e., what services and content they can and cannot access.
  the quality of service for a subscriber—how good of a user experience for a service, or how much bandwidth a subscriber is allowed to get for any service
  what the subscriber should be charged for a particular service or application
 In order for the customer to be provided with a consistent set of policies, there should be a mechanism by which the policy function in the network responsible for controlling the enforcement points (typically, this is referred to as the 'visited' network), be able to communicate with the 'home' policy function, which contains all the information about the subscriber's policies.

In one aspect, the invention is a method of disseminating topology information related to a subscriber in a system having one or more networks, each network having access devices and policy functions. The method includes identifying a current location of the subscriber by a serving policy function. The method further includes forwarding information relating to the current location from the serving policy function to an anchor policy function associated with the subscriber.

One embodiment further includes performing the identifying step and the forwarding step each time the subscriber moves to a different serving policy function. Another embodiment further includes using the information related to the current location of the subscriber to route policy information related to the subscriber from the anchor policy function to the serving policy function.

One embodiment further includes further includes routing policy information related to the subscriber and requests for the policy information by implementing a push model. Another embodiment further includes routing policy information related to the subscriber and requests for the policy information by implementing a pull model.

One embodiment further includes maintaining, with the anchor policy function, state information associated with the subscriber, and executing policy rules according to the state information.

In another embodiment, the serving policy function and the anchor policy function are located in different service provider networks, such that the step of forwarding information relating to the current location further includes conveying the information relating to the current location across at least one service provider network boundaries.

One embodiment further includes the serving policy function implementing one or more resource level policy rules to limit or control policy decisions associated with the subscriber, based upon resource consumption in the network for which the serving policy server oversees resource control.

Yet another embodiment further includes decoupling the serving policy function from the anchor policy function. One embodiment further includes disseminating the information relating to the current location of the subscriber to one or more other policy functions in the system.

Another aspect is a system for disseminating topology information related to a subscriber in a network having one or more sub-networks, each sub-network having access devices and policy functions. The system includes a serving policy function for identifying a current location of the subscriber, and an anchor policy function associated with the subscriber for receiving information relating to the current location from the serving policy function.

In one embodiment, each time the subscriber moves to a different serving policy function, the different serving policy function identifies the current location of the subscriber and forwards the current location to the anchor policy function.

In another embodiment, the network routes policy information related to the subscriber from the anchor policy function to the serving policy function using the information related to the current location of the subscriber.

In one embodiment, the network routes policy information related to the subscriber and requests for the policy information by implementing a push model. In another embodiment, the network routes policy information related to the subscriber and requests for the policy information, by implementing a pull model.

In one embodiment, the anchor policy function maintains state information associated with the subscriber, and executes policy rules according to the state information. In another embodiment, the serving policy function and the anchor policy function are located in different service provider networks, such that the information relating to the current location is conveyed across at least one service provider network boundaries.

In another embodiment, the serving policy function implements one or more resource level policy rules to limit or control policy decisions associated with the subscriber, based upon resource consumption in the sub-network for which the serving policy server oversees resource control.

In one embodiment, the serving policy function is decoupled from the anchor policy function.

Another embodiment further includes one or more other policy functions in the network. The information relating to the current location of the subscriber is disseminated to the one or more other policy functions.

DESCRIPTION OF THE PREFERRED EMBODIMENTS

Figure 1:
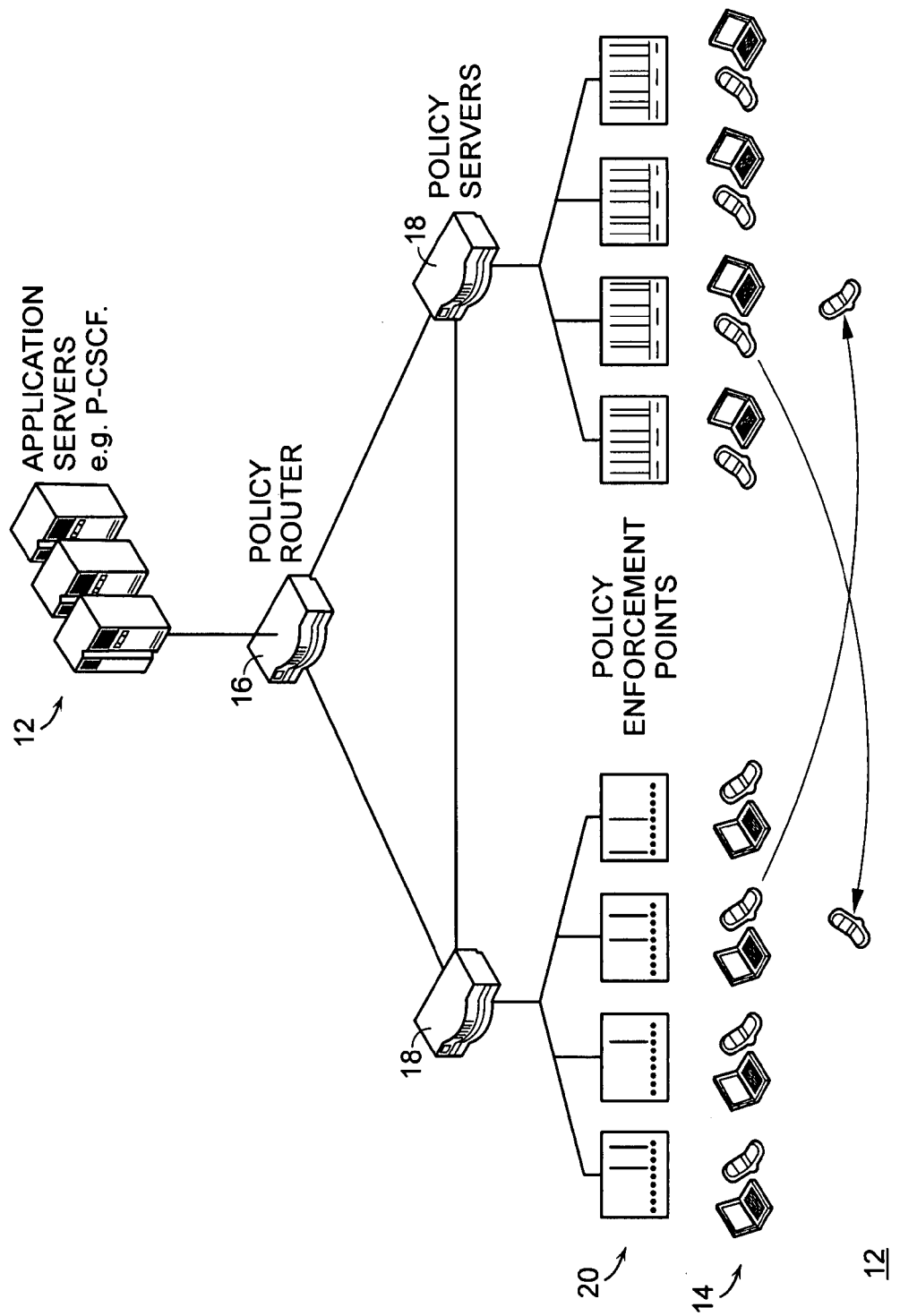
FIG. 1 shows a prior art system 10 for delivering digital content to a number of subscribers.
Figure 2:
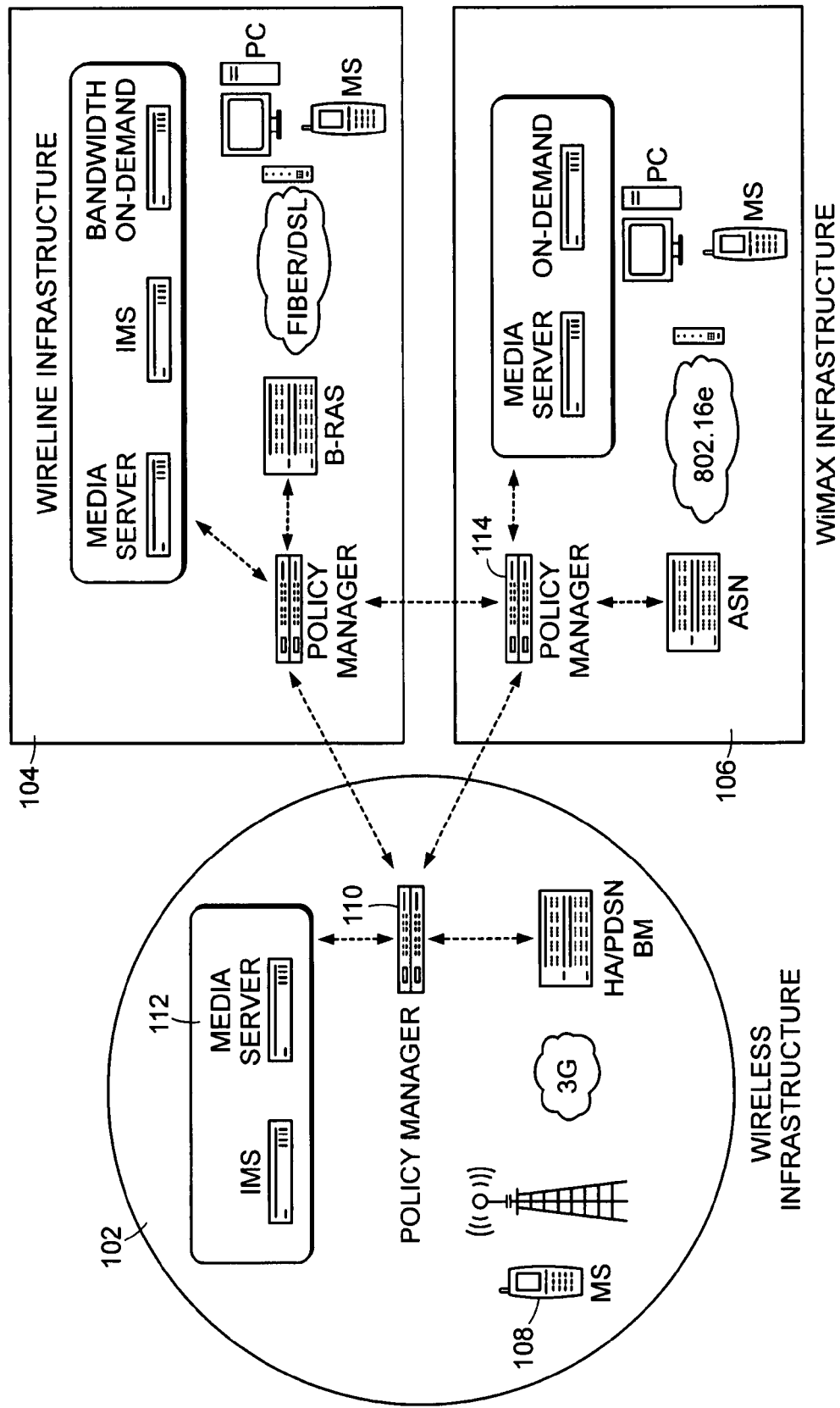
FIG. 2 shows an exemplary embodiment of a system architecture constructed and arranged according to the invention.

FIG. 2 shows an exemplary embodiment of a system architecture constructed and arranged according to the invention. The exemplary system shown in FIG. 2 includes a wireless network 102, a wireline network 104 and a WiMAX (i.e., IEEE 802.16) network 106.

In the wireless network 102, a subscriber 108 uses a mobile device (MS) to access the wireless network 102. The subscriber 108 subscribes to a particular access provider, for example Sprint®. The subscriber's policy function 110 is located within the Sprint wireless network 102.

Consider the situation in which the subscriber 108 "roams" to another access provider's network. In this example, the Sprint network 102 is considered the subscriber's "home network." The policy function 110 in the sprint network (a policy manager in this example) is the subscriber's "home policy function"—or the "anchor policy function."

Suppose the subscriber roams to an access provider that supports a different type of network, for example a WiMAX wireless network 106. Once the subscriber 108 is connected into the WiMAX network, the subscriber may want to access applications 112 that are located in its home network (i.e., the Sprint network 102). To accomplish this, the policies of the subscriber 108 that reside in the home policy function 110 need to ultimately be implemented in the network in which the subscriber is visiting (i.e., the WiMAX network 106).

However, the home/anchor policy function 110 from the wireless network 102 does not and cannot directly control the WiMAX network 106 (i.e., the network into which the subscriber has roamed). For a variety of security reasons, a network provider typically does not allow an outside entity to directly control its network equipment for policy enforcement. Therefore, the home/anchor policy function must communicate and coordinate with the "visited" policy function, in this example the policy manager 114 in the WiMAX network 106, to allocate the necessary network assets. This visited policy function is also referred to herein as the "serving" policy function, because it is the policy function responsible for serving the subscriber in the visited network.

The described embodiments include techniques and mechanisms that fulfill the following objectives:

1. Associate a given subscriber with a particular policy server, even when the subscriber accesses the network in a mobile or nomadic fashion. The subscriber can therefore be associated with the appropriate visited policy function, and the correct home/anchor policy function
2. Free an application from determining which policy server is responsible for determining the policy for accessing a given application, even when the subscriber accesses the network in a mobile or nomadic fashion 3. Allow a policy server to map application addressing (typically the 5-tuple IP source address, IP destination address, source port, destination port, and protocol), as well as other the subscriber identifiers such as MAC addresses or email ID (Invariant Subscriber Identifier or ISI), to the network edge device currently supporting a particular subscriber.

Each subscriber station in the access network is associated with an invariant subscriber identifier (ISI) dependant on the particular access technologies that the subscriber uses. Examples of an ISI include an Electronic Serial Number, a phone number, a Mobile Station Integrated Services Digital Network number (MS-ISDN), an International Mobile Subscriber Identifier, an Ethernet Media Access Control (MAC) address, among others. Unlike an IP address range that can change each time the subscriber accesses the network from a different access device, the ISI is associated with the subscriber and doesn't change from access to access, or when the subscriber accesses the network via a different subscriber access device. The extent to which (i) the ISI number codes the "typical" location from which the subscriber accesses the network, and (ii) sequential identifiers are likely provisioned from the same location, can make the mapping operation more efficient, but is not specifically required by the embodiments describe herein.

A Policy Server (hereinafter "PS") can "learn" or be provisioned with information identifying which ISIs they typically serve. In this way a particular PS becomes the "anchor" PS for a given set of subscribers. Being the "anchor" PS means that PS will always be the ultimate policy decision maker for the associated subscriber, regardless of where the subscriber may be currently accessing the network.

Statefulness

The anchor PS for a particular subscriber is stateful of the subscriber. Being "stateful" means that whenever the subscriber is on the network, the anchor PS is aware of (i.e., has information regarding) the state of the subscriber, in terms of which applications requiring policy the subscriber has invoked. Even when the subscriber moves across the network, for example to another region of the network that has its own policy server, policy requests ultimately need to interact with the anchor PS for that subscriber. Because the anchor PS is aware of the subscriber, it can make policy decisions based on subscriber-centric parameters (i.e., parameters specific to that subscriber). For example, the anchor PS can execute policy rules that determine what a subscriber may or may not do, based on who he is, what tier or packages of service he has purchased or is entitled to, and how many of such application sessions he may be allowed, among others.

Although the anchor PS is stateful of the subscriber and its policy parameters, the anchor PS may not have information regarding what network resources the subscriber is utilizing. This is because the anchor PS may not be the serving PS, if the subscriber is roaming, as an example. The anchor PS is in the home network, and if the subscriber is in a location that is being served by another PS (visited PS or serving PS because the subscriber has roamed into another part of the network or to another provider), then it is only the visited or serving PS that is aware of the network resources the subscriber is utilizing. As a result, the serving or visited PS can be in charge of network resource-centric policies (i.e., policies specific to those network resources). The visited or serving PS can execute the policy rules that focus on setting thresholds for resource consumption. Because the serving PS is the one interfacing with the enforcement points, and it is aware of all the sessions that are being admitted over the enforcement points it controls, it is aware of the resources that are being utilized. As a result, the serving PS can enforce policy rules that control the amount of resources (e.g., bandwidth, or number of sessions) that can be admitted over the enforcement points.

The anchor PS is therefore responsible for executing subscriber-centric policies, and the visited or serving PS is responsible for executing resource-centric policies. An anchor policy server that is stateful of the subscriber's sessions can implement subscriber-aware policy rules to control what a subscriber is entitled to do. For example, the anchor PS can deny a third session if the subscriber already has two simultaneous sessions running. Or, the anchor PS can deny a request for video if the subscriber currently has a voice application running. For the same scenario, the anchor PS could allow the request for video if the subscriber is in an elite (i.e., "gold") service tier, even when the voice application is already running.

Percolation of Topology Through the Network

Each time a subscriber registers onto the network, information about the subscriber's point of attachment (i.e., topology) must be percolated through the relevant policy functions in the network. This ensures that for roaming subscribers, the correct set of policy functions will participate in the policy activity when applications are invoked. The result is that subscriber-centric policies, as well as resource-centric policies, are properly executed and enforced.

Figure 3:
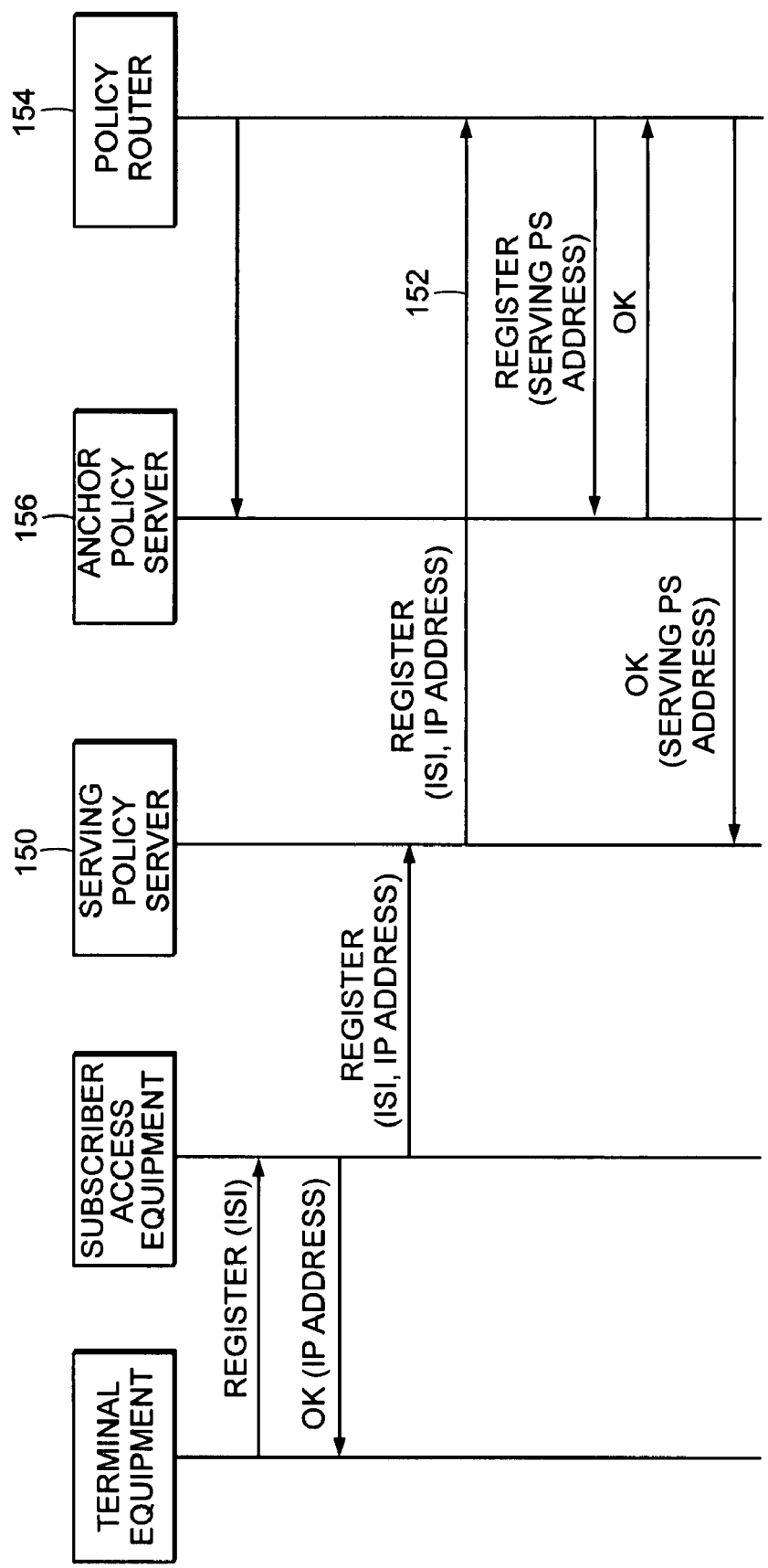
FIGS. 3 and 4 show the serving PS 150 forwarding registration information to the designated policy router
Figure 4:
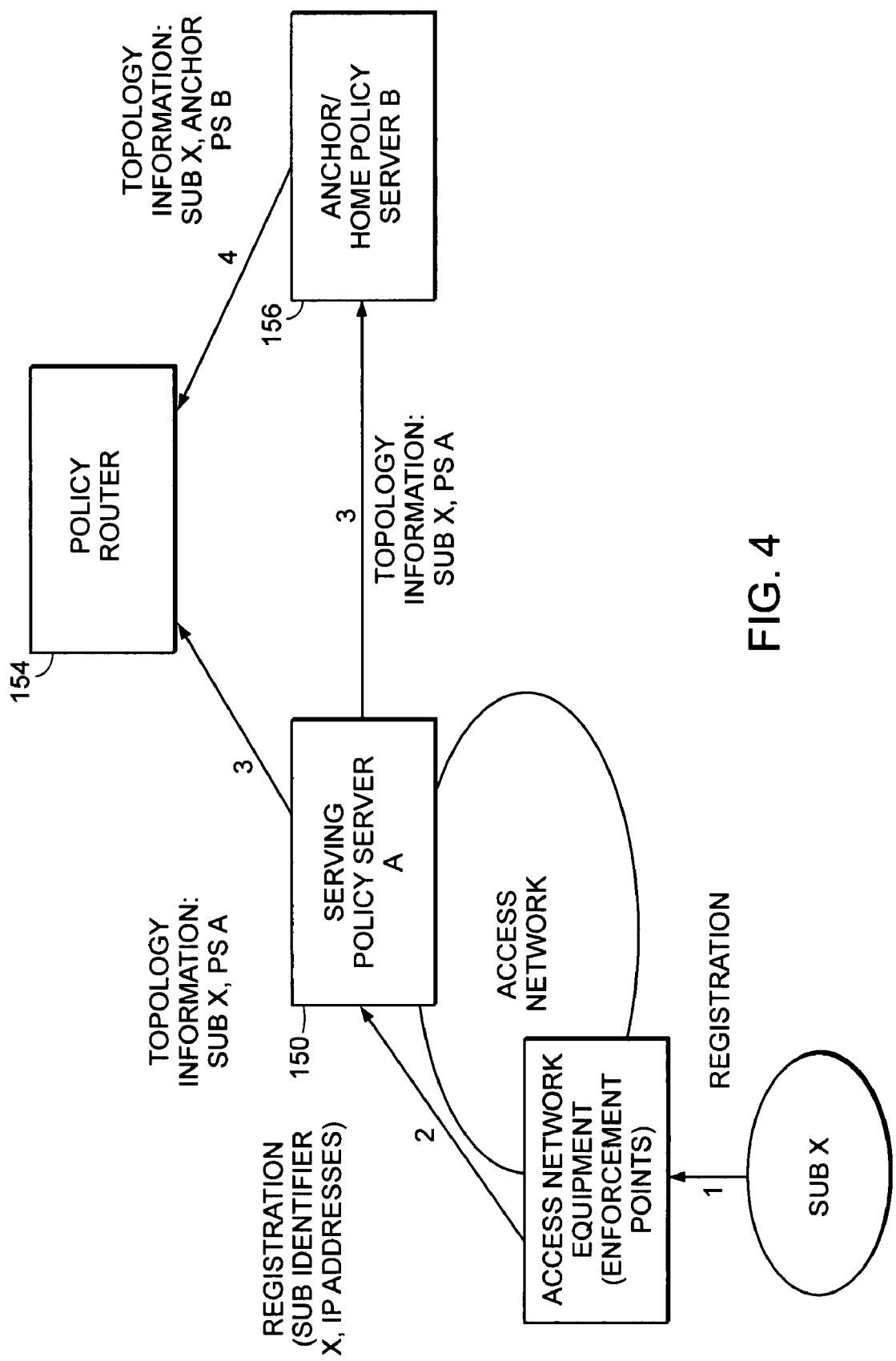

There are several ways in which this topology information can be disseminated. As shown the diagrams of FIGS. 3 and 4, the serving policy server 150 can forward registration information 152 to the designated policy router 154 in the network (this designation information can be provisioned on the serving policy server, or it can be algorithmically derived by the serving policy server).

The policy router can then be responsible for forwarding the registration information to the anchor PS designated for the subscriber. The policy router can gain information regarding which anchor PS is designated for a particular subscriber in a number of different ways, for example:

The policy router can be provisioned with the information;
The policy router can retrieve the information via an external database lookup;
The policy router can algorithmically derive the information (for example, based on the telephone number of the device the subscriber is using, use the area code to locate the anchor); or,
The anchor PS can percolate the topology information to the policy router.

Once the policy router forwards the registration information to the designated anchor PS, both the policy router and the anchor PS know which serving or visited PS is currently associated with the subscriber. If the subscriber physically moves, a new serving PS may be associated with the subscriber. When this happens, the registration process happens all over again and the anchor and the policy router will "discover" or "learn" the new association as described above.

Alternatively, the serving PS may use similar mechanisms as above to send the topology information to the anchor PS as well. For example, when the subscriber registers, the serving PS can use the realm information in the registration to determine which anchor policy server should receive the registration/topology information.

Registration and Topology Learning

Subscribers access the network via subscriber access equipment such as a Cable Modem Termination System (CMTS), Packet Data Serving Node (PDSN), Gateway GPRS Serving Node (GGSN) or Broadband Remote Access Server (B-RAS) device that will typically assign a dynamic IP networking address to the subscriber station. A PS provides the Policy Decision Function (PDF—determines the rules for Quality of Service, admission control, and packet processing disciplines, and how the particular session should be charged) for application data streams flowing from network applications to the subscriber through subscriber access equipment.

Once the subscriber registers onto the network, the subscriber may invoke applications through signaling with the application function. The application function may reside in a centralized location, and the application function is unaware of the physical location of the subscriber with respect to the network.

When a subscriber initiates a request for a session from an application server, the application function/server issues a request to the PS for a policy decision, which ultimately decides the policies (QoS treatment and the charging rules associated with the particular session as well as potentially entitlements). The PS evaluates the request against the rules that have been provisioned on the PS (rules can be based on information such as subscriber tier, time of day, network usage) and pushes down the policy decision (QoS policy decision as well as charging) down to the subscriber access equipment, i.e., the enforcement point.

As the network gets larger, it is usually desirable to partition the PDF across multiple PSs, each signaling a set of subscriber access equipment. A policy router allows applications to have a single point of contact for policy decisions across the network and frees applications from knowledge of the network topology or subscriber location. The policy router maintains the knowledge of which subscriber access device is serving the subscriber and which PSs (serving and anchor) may implement policy decisions related to the subscriber.

In a mobile network, when a subscriber first accesses the system, the subscriber access equipment signals the network IP address and the ISI to its associated PS. In non-mobile networks, the PS may learn of the subscriber association through other means, including SNMP, or through provisioning. The PS will learn the association of the subscriber to the enforcement point relationship and provide the information to the policy router. The policy router can now use the information to perform its policy routing function—which is when an application issues a request to the policy router, it can now figure out which PS to route the request to based on either the subscriber IP address or the ISI.

PSs can also be provisioned to be the 'anchor' PS for a particular subscriber, so that no matter where the subscriber is physically located (the subscriber could move between different enforcement points), the policy requests are always routed to the anchor PS. It is then the responsibility of the anchor PS to route the request to the serving PS responsible for serving the particular enforcement point with which the subscriber is now associated. The policy router can use the ISI to route the request to the anchor PS, and the anchor PS can use either the ISI or the subscriber IP address in order to route to the serving PS.

This anchoring technique is useful when there is a distribution of policy functions in the network due to scalability, as well as when subscribers are roaming between networks or network providers.

Figure 5:
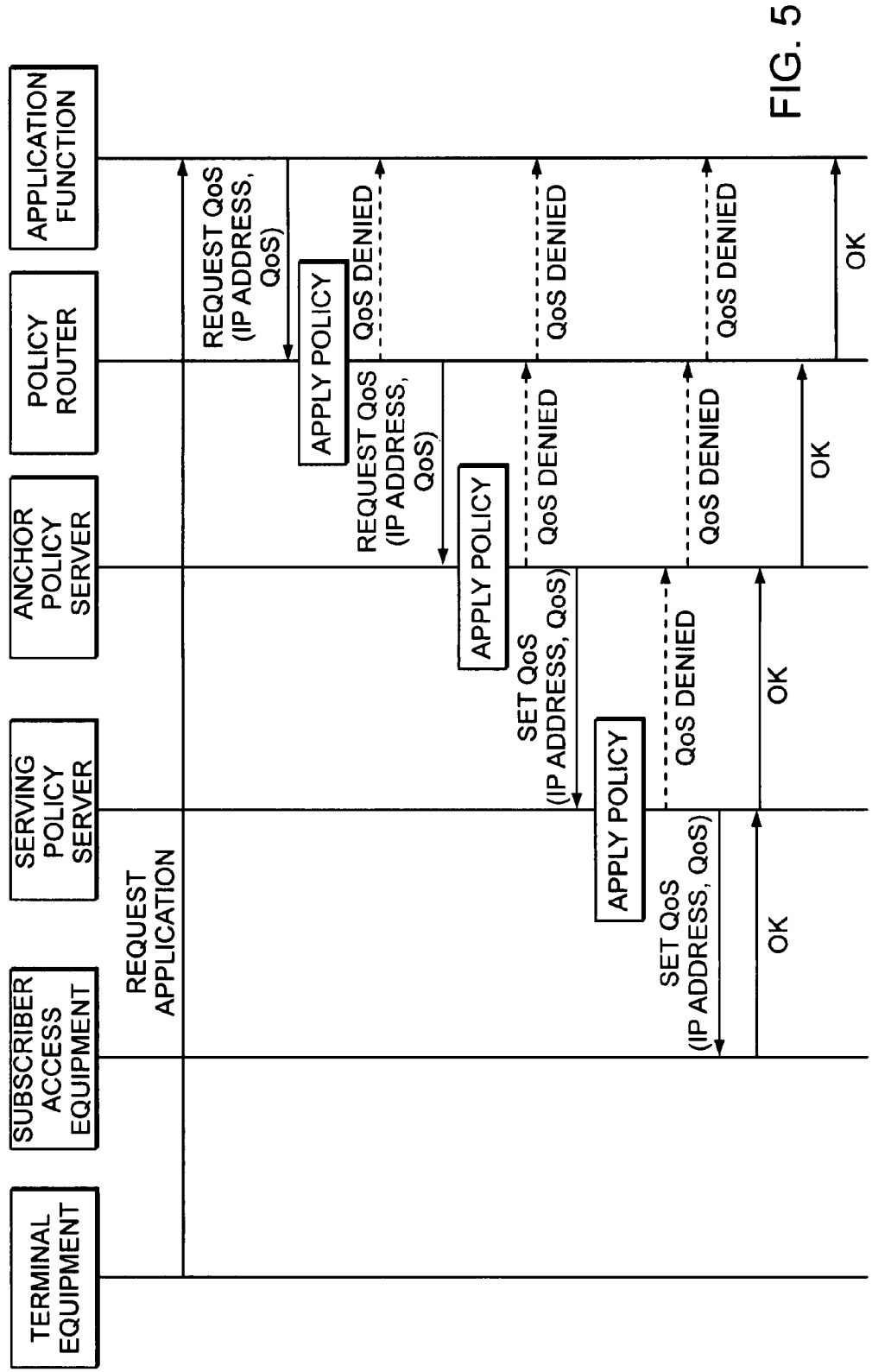
FIGS. 5 and 6 illustrate the routing of policy requests from the policy router, to the anchor, then to the serving PS.
Figure 6:
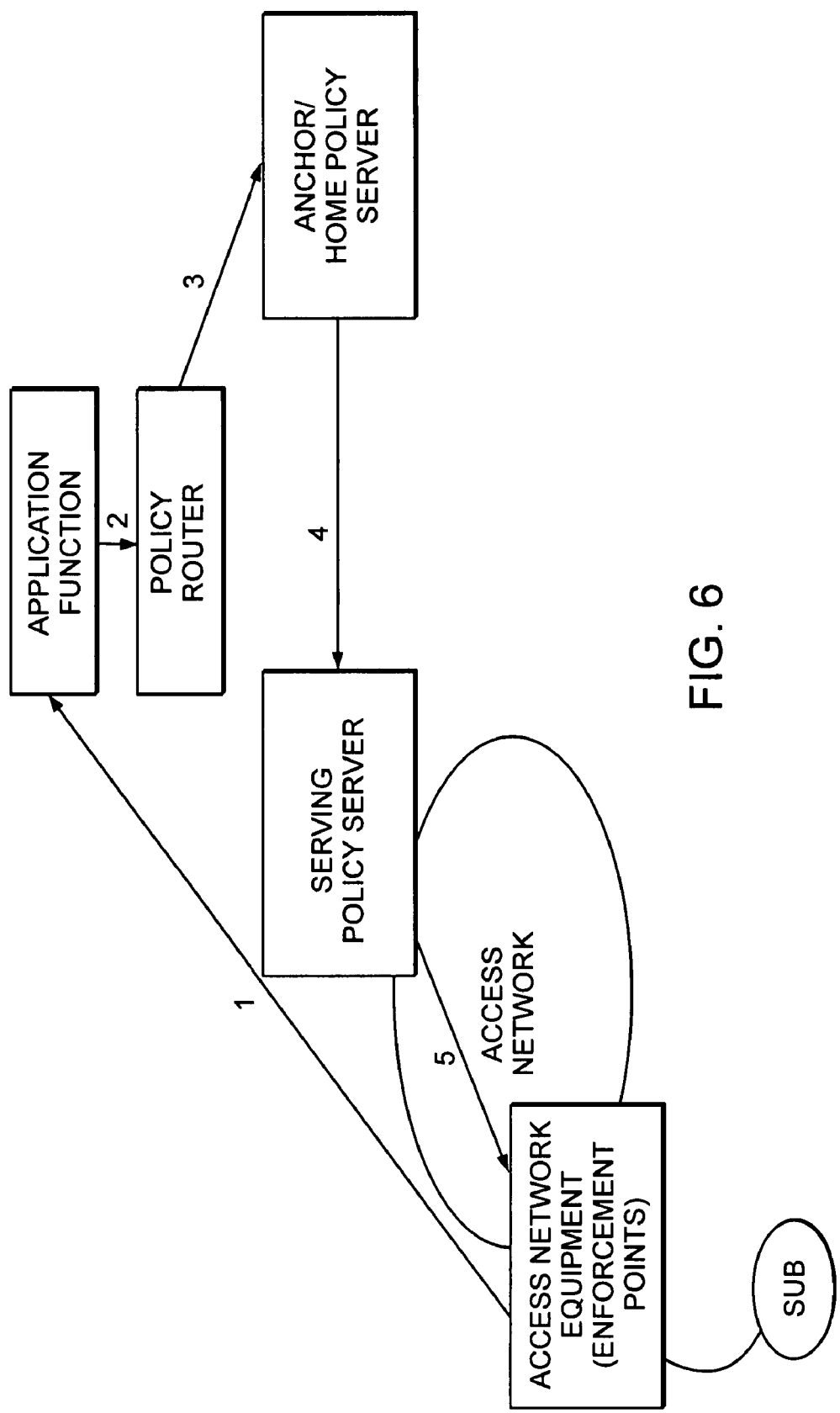

FIGS. 5 and 6 illustrate the routing of policy requests from the policy router, to the anchor, then to the serving PS. Each PS can route appropriately based on the topology information learned during the registration process.

In one embodiment the application function, and the policy router, reside in a third party network or application provider's domain. In another embodiment, all policy components reside in different networks or provider domains.

In the scenario described above, the subscriber accesses an application that is located at a centralized part of the network. The application function issues the policy request to its default PS—which in this case is the policy router. The policy router is then responsible for forwarding the policy request to the relevant anchor PS in order for the anchor PS to execute subscriber centric policies. The anchor PS executes its relevant policy rules, and then forwards the request onto the serving PS.

Push Model

The policy interactions described so far implement a "push" model for policy distribution; the application function 'pushes' the request to the policy router, the policy router 'pushes' the request onto the anchor PS, and the anchor 'pushes' the request to the serving PS.

The topology learning process is critical in being able to implement the push model for policy. When a subscriber accesses an application that requires QoS, the application will signal the request to the policy router. The policy router may evaluate certain global or application specific policy rules before looking up the anchor PS for the subscriber and forwarding the QoS request to that anchor PS for evaluation. The policy router and the anchor PS could be in the subscriber's 'home network' domain (e.g., if this is a Sprint subscriber, and the subscriber is accessing a Sprint service from another network, the application, the policy router and the anchor PS involved in the transaction would all be within Sprint's domain).

The anchor PS evaluates the QoS request with respect to subscriber policy rules (referred to herein as subscriber-centric rules—e.g., how many sessions the particular subscriber is allowed to have concurrently, or what applications and services is the subscriber entitled to, or has the subscriber exceeded some usage limit, for example). If the QoS request is evaluated as being acceptable, the anchor PS sends the request to the 'serving' PS interfacing to the subscriber access device currently serving the subscriber.

If required, the anchor PS may also evaluate the QoS request based on administrative policy rules (for example, if the subscriber was roaming in another administrative domain). Ultimately the serving PS will send the QoS directive to the subscriber access equipment to implement the QoS for the subscriber. The serving PS may reside in a visited network. The serving PS will execute policy rules around resource usage—controlling the amount of resources that are consumed on the access network.

For example, the serving PS can deny a subscriber's request for resources if the total bandwidth consumed on the access network over which the subscriber is receiving service (under the domain of the visited/serving policy server) exceeds some predetermined threshold X. Another example—the serving PS can deny a video request from a subscriber if the bandwidth consumed for all video applications over a particular enforcement point (under the control of the serving/visited policy server) exceeds some predetermined threshold Y. Or, the serving PS can deny the above request for video the total number of voice sessions currently being delivered over a particular enforcement point exceeds another predetermined threshold Z.

Alternatively, the application function could also reside in the same domain/network as the anchor PS, in which case the application function will signal directly to the anchor PS and treat the anchor as the application function's default PS. The anchor PS performs both the policy routing functions (because it is routing to the serving PS) as well as the PS responsible for executing the subscriber-centric policy rules. The anchor policy server is also directly interfacing to the application function.

Figure 7:
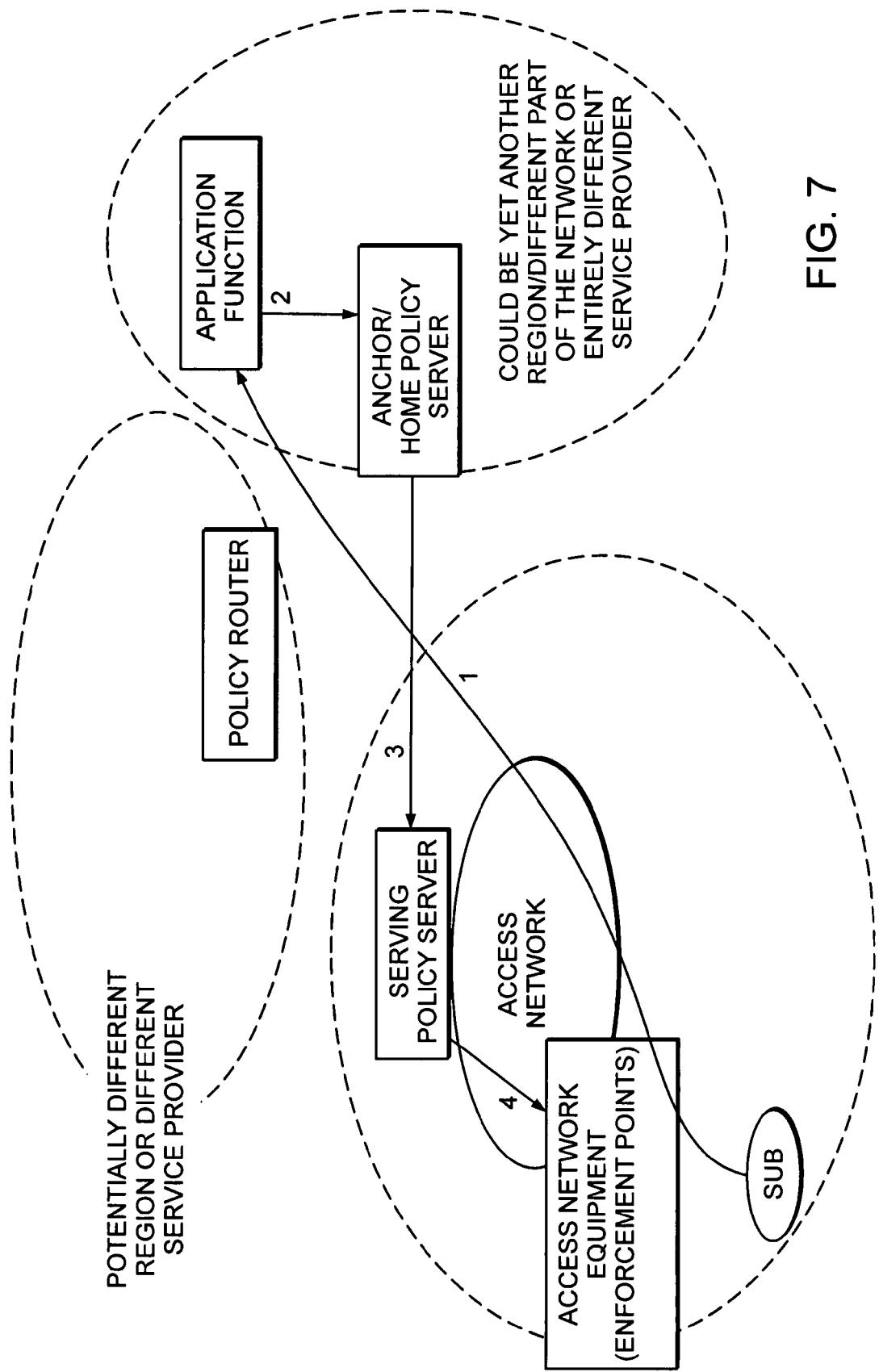
FIG. 7 illustrates an embodiment in which the location of the application function resides in the same network as the anchor PS.

FIG. 7 illustrates an embodiment in which the location of the application function resides in the same network as the anchor PS, and thus using the anchor PS as the application function's default PS.

In the system shown in FIG. 7, the subscriber's serving PS may be in a visited network (e.g., Telus), but the subscriber is a Verizon customer and his anchor policy server is in the Verizon network, along with the applications the subscriber wishes to access. In some embodiments, networks operated by different commercial entities cooperate through what is referred to herein as "policy peering." Using the roaming information associated with the subscriber, the serving and anchor policy servers can implement policy inter-operator service level agreements (SLAs) and other business agreements.

An application request can originate from a subscriber physically located in a network or provider different from that in which the anchor PS resides. The policy request is ultimately forwarded onto the serving or visited PS. In this scenario, the visited PS can be used to limit what the third party application can request of the visited network. For example, based on the agreed-to business arrangement between two parties (the access network provider and the content provider) the visited policy server can keep track of what has been admitted into the network for content/applications invoked by the third party content/application provider Depending on the scale of the deployment, the logical policy functions (such as routing, anchor, serving, etc.) can be co-located to reduce complexity of the architecture.

Figure 8:
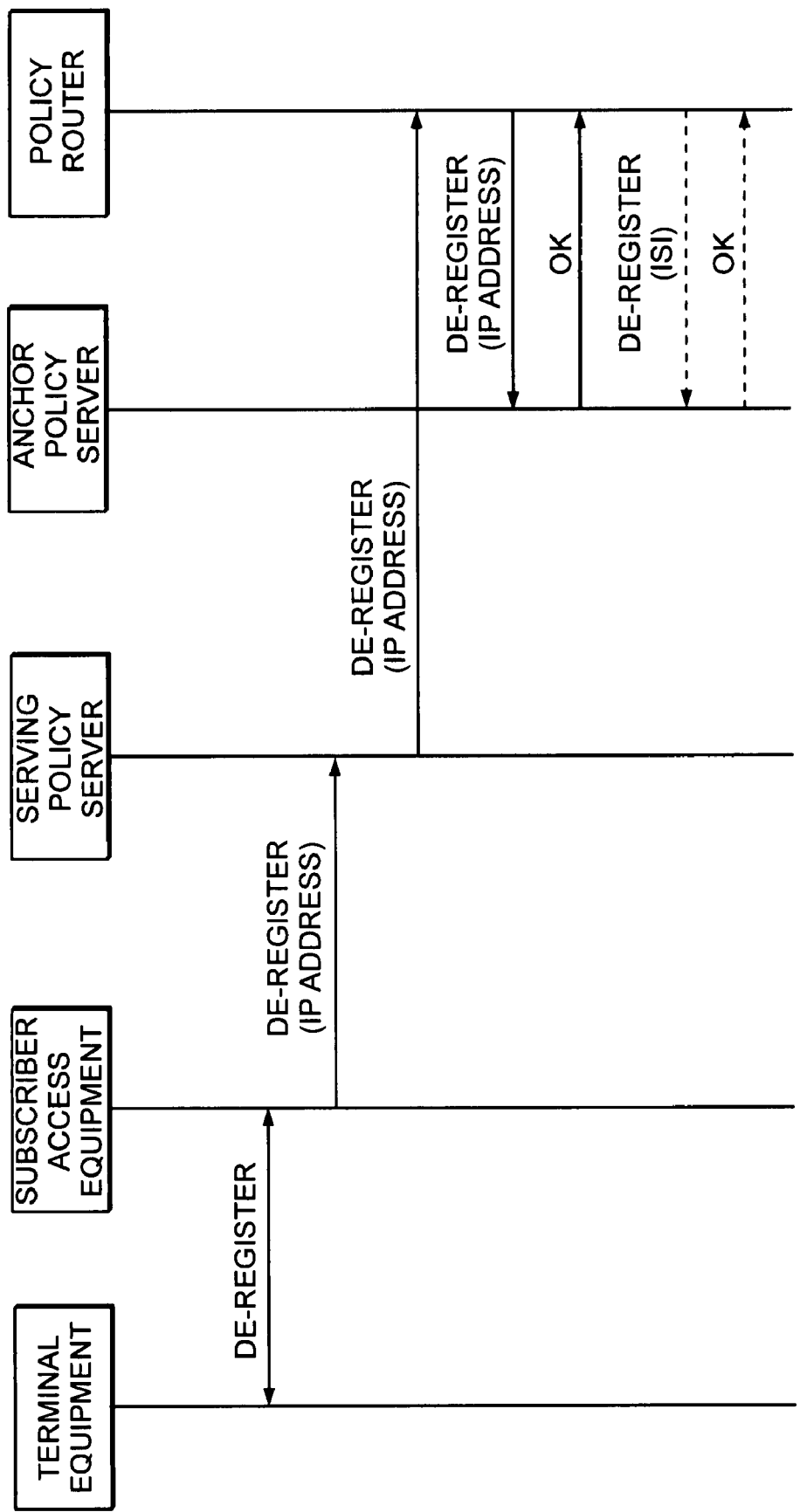
FIG. 8 is an exemplary message flow for one embodiment of the system shown in FIG. 2.

In the wireless world, when the subscriber de-registers from the subscriber access equipment, a de-registration message is sent to the serving PS, which is forwarded to the policy router. FIG. 8 is an exemplary message flow for one embodiment. The policy router forwards the de-registration event to the anchor PS to indicate that the subscriber is no longer accessible on the network or associated with a serving PS. Alternatively, the de-registration message can be directly forwarded from the serving PS to the anchor PS as well.

Generally a subscriber will be associated with a particular anchor PS, and this relationship should be persistent in most instances. However, there may be cases where the subscriber's anchor PS changes over time. Periodically, based on an administratively set timer, the policy router and the anchor PS may flush the ISI from the range of served ISI. This may be done in case there is a more efficient PS that could serve the subscriber based on the subscriber access equipment typically used.

Pull Model

Another method of policy distribution is implemented via the 'pull' model. In the pull model, the client/subscriber invokes a policy request directly, instead of the request coming from the application function. The client may use messaging like RSVP to trigger a request from the access equipment (enforcement point). The access equipment may initiate a policy request from its designated serving PS. The serving policy server may need to retrieve the correct set of policies for the subscriber from the anchor PS. Using the same type of mechanisms that were used during the topology discovery/distribution phase, the serving PS could 'pull' for the correct set of policies from the anchor PS. It is likely that in large-scale deployments, both push and pull models are implemented in the network.

Figure 9:
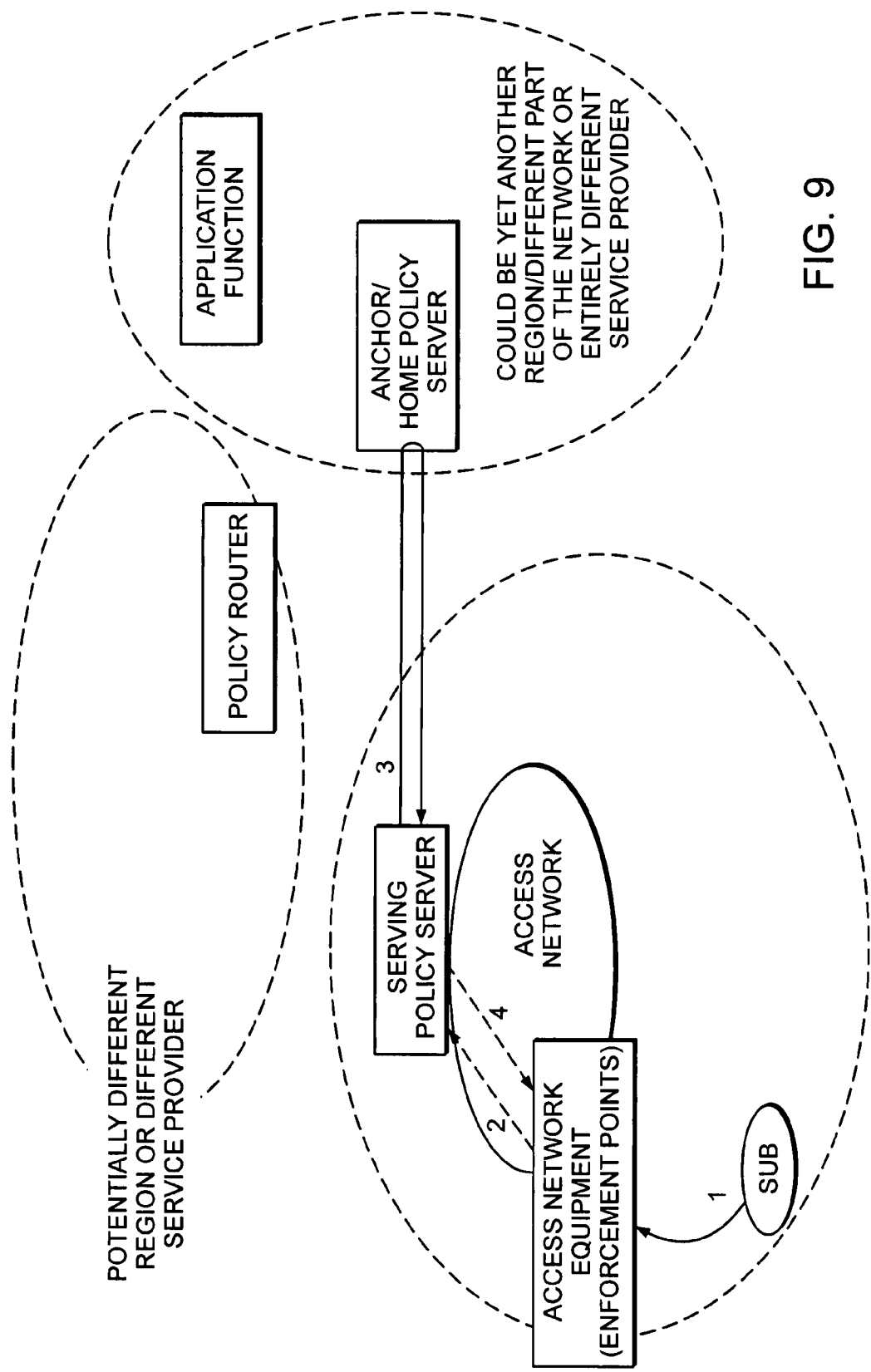
FIG. 9 illustrates a 'Pulling' model for disseminating policies.

FIG. 9 illustrates a 'Pulling' model for disseminating policies, in which the subscriber triggers a policy request. The Access network equipment could pull for policies from the Serving PS. The serving PS, using the same type of methods that it used for the distribution of topology information, can pull for the policy for the subscriber from the anchor PS. The types of policies that can be pulled include subscriber entitlements (what services/applications is the subscriber entitled to have access to), QoS treatment for any one of the services, how the services should be billed (flat rate billing, or per byte billing, or time based billing, etc).

When the subscriber first registers onto the network, the serving PS is aware of whether the subscriber is roaming or not. The anchor PS is also aware of the subscriber's roaming status. Roaming information can be inferred from messaging from the access network equipment when the subscriber first attaches to the network. The subscriber's realm information that is present in the initial attachment message can provide information about the subscriber. For example, the subscriber may be a Verizon wireless subscriber roaming into the Telus network. The information from the subscriber/client will indicate that he is a Verizon wireless subscriber. The serving PS uses this information to determine which anchor PS or policy router should receive the topology information (in a push from the serving PS) and provide policy information (in a pull by the serving PS).

Various policy servers can also use the subscriber's realm information to execute policy rules against the subscriber. For example, the serving PS in the Telus network may have rules, which provide a different level of treatment if the subscriber is a Verizon subscriber, as opposed to a subscriber of some other service provider. If there are service level agreements or business agreements put in place between Telus and Verizon, the Telus serving PS may be used to implement those business rules, such as providing enhanced QoS for voice, video or data services. In some embodiments, the realm information is also used to provide differential billing, in which a subscriber is billed differently for the various applications as a function of the particular realm.

The invention may be embodied in other specific forms without departing from the spirit or essential characteristics thereof. The present embodiments are therefore to be considered in respects as illustrative and not restrictive, the scope of the invention being indicated by the appended claims rather than by the foregoing description, and all changes which come within the meaning and range of the equivalency of the claims are therefore intended to be embraced therein.

What is claimed is:

1. A method of operating a system that includes a home network and a visited network to which a device associated with a subscriber is connected, said method comprising:
   at a serving policy function entity on the visited network, determining a current location of the subscriber device;
   forwarding information relating to the current location of the subscriber from the serving policy function entity to an anchor policy function entity on the home network, wherein the subscriber is associated with the anchor policy function entity;
   at the network routing device receiving an application request from a subscriber device via an enforcement point through which the subscriber accesses the visited network, and routing the request directly to the anchor policy function entity;
   at the serving policy function entity, receiving from the anchor policy function entity a first set of policy decisions regarding the subscriber made by the anchor policy based on the received location related data and the received request;

at the serving policy function entity, making a second set of policy decisions regarding network resources to be allocated for the subscriber on the visited network based on the first set of policy decisions;

controlling the enforcement point by delivering a policy decision from the serving policy function entity to the enforcement point; and at the enforcement point, enforcing the policy decision.

2. The method of claim 1 wherein delivering the policy decision comprises sending the first and second sets of policy decisions from the serving policy function entity to the enforcement point.

3. The method of claim 1, wherein the first set of policy decisions includes subscriber-centric policy decisions.

4. The method of claim 1, wherein the second set of policy decisions includes network resource-centric policy decisions.

5. The method of claim 1, wherein the home network and the visited network are different networks.

6. The method of claim 2, wherein the serving policy function entity is responsible for serving the subscriber when the subscriber is on the visited network.

7. The method of claim 2, wherein the serving policy function entity is responsible for making policy decisions regarding the visited network and communicating said policy decisions to enforcement devices on the visited network.

8. The method of claim 1, wherein the serving policy function entity is responsible for network resources of the visited network.

9. The method of claim 1, wherein the anchor policy function entity is responsible for subscriber-centric policies.

10. The method of claim 1, wherein the anchor policy function entity is unable to directly control any network resources available on the visited network.

11. The method of claim 1, wherein the anchor policy function entity sends to the serving policy function entity the first set of policy decisions regarding the subscriber in response to receiving, from an application function, a policy request.

12. The method of claim 1 wherein enforcing a policy rule at the enforcement point comprises enforcing a policy rule that controls at least one of bandwidth and a number of sessions that can be admitted over the enforcement point.

13. A system for distributed policy services for mobile and nomadic networking, the system comprising:

a network routing device is configured for receiving, from a mobile subscriber device and via an enforcement point through which the subscriber accesses a visited network, an application request;

an anchor policy function entity in a subscriber's home network is configured for receiving the application request from the network routing device and for making a first set of policy decisions regarding the subscriber based upon the received request and current subscriber location information; and a serving policy function entity in the visited network is configured for receiving the first set of policy decisions from the anchor policy function entity and making a second set of policy decisions regarding network resources to be allocated for the subscriber on the visited network, and said serving policy function entity is further configured for controlling the enforcement point by delivering a policy decision to the enforcement point, wherein the enforcement point enforces the policy decision.

14. The system of claim 13 wherein the enforcement point enforces the policy decision.

15. The system of claim 13 wherein the serving policy function entity is configured to determine a current location of the subscriber device and forward the information relating to the current location of the subscriber to the anchor policy function entity.

16. The system of claim 15 wherein at least one of the serving policy function entity and the anchor policy function entity is configured to use the information relating to the current location of the subscriber to determine a network topology or subscriber location information.

17. The system of claim 13 wherein the policy decision that is delivered to the enforcement point controls the amount of resources that can be admitted over the enforcement point.

18. The system of claim 13 wherein the first set of policy decisions includes subscriber-centric policy decisions and wherein the second set of policy decisions includes network resource-centric policy decisions.

19. The system of claim 14 wherein the serving policy function delivers a policy decision to the enforcement point by using a Diameter protocol signaling message.

* * * * *